United States Patent
Slater et al.

(10) Patent No.: US 9,740,704 B2
(45) Date of Patent: Aug. 22, 2017

(54) METHOD AND APPARATUS FOR RANDOM ACCESS OF DATA STORED IN A SEQUENTIAL MANNER

(75) Inventors: Alastair Slater, Chepstow (GB); Simon Pelly, Bristol (GB); Garry Brady, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 764 days.

(21) Appl. No.: 12/695,261

(22) Filed: Jan. 28, 2010

(65) Prior Publication Data

US 2011/0184909 A1 Jul. 28, 2011

(51) Int. Cl.
G06F 17/00 (2006.01)
G06F 7/00 (2006.01)
G06F 17/30 (2006.01)
G06F 3/06 (2006.01)

(52) U.S. Cl.
CPC ........ *G06F 17/30156* (2013.01); *G06F 3/067* (2013.01); *G06F 3/0608* (2013.01); *G06F 3/0641* (2013.01)

(58) Field of Classification Search
CPC ............. G06F 11/1448; G06F 11/1453; G06F 11/1469; G06F 2201/84
USPC .......................... 707/610, 637, 609; 711/216
See application file for complete search history.

(56) References Cited

U.S. PATENT DOCUMENTS 7,584,228 B1* 9/2009 Protassov ......... G06F 17/30156
707/999.104
7,672,981 B1* 3/2010 Faibish ............. G06F 17/30079
707/999.204
7,747,584 B1* 6/2010 Jernigan, IV ..... G06F 17/30156
707/692
7,814,149 B1* 10/2010 Stringham ........ G06F 17/30156
707/758
7,996,371 B1* 8/2011 Deshmukh ........ G06F 17/30156
707/692
8,166,261 B1* 4/2012 Cremelie .......... G06F 17/30097
707/692
8,204,862 B1* 6/2012 Paulzagade ......... G06F 11/1469
707/679
8,285,957 B1* 10/2012 Nag .................. G06F 17/30156
707/693
8,306,948 B2* 11/2012 Chou ................ G06F 17/30088
707/610
2004/0221295 A1* 11/2004 Kawai .................. G06Q 10/107
719/313

(Continued)

OTHER PUBLICATIONS

Komiega, Kevin, INFOSTOR, Quantum offers NAS-based dedupe appliances, Oct. 21, 2009 (3 pages).

(Continued)

*Primary Examiner* — Pavan Mamillapalli
(74) *Attorney, Agent, or Firm* — Hewlett Packard Enterprise Patent Department

(57) ABSTRACT

A deduplication engine is operable to select at least two chunks of data for deduplication and deduplicate the selected at least two chunks of data. A first store is operable to store the deduplicated chunks of data in a sequential manner, and a second store is operable to store at least a portion of at least one chunk of the deduplicated data in a manner to allow random access, where data is accessed via the first and/or second store.

18 Claims, 2 Drawing Sheets

(56) References Cited

U.S. PATENT DOCUMENTS

| | | | |
|---|---|---|---|
| 2008/0086606 A1* | 4/2008 | Kuwabara | G06F 3/0605 |
| | | | 711/154 |
| 2008/0282047 A1* | 11/2008 | Arakawa | G06F 11/1451 |
| | | | 711/162 |
| 2009/0171888 A1* | 7/2009 | Anglin | 707/2 |
| 2009/0193223 A1* | 7/2009 | Saliba et al. | 711/216 |
| 2009/0228599 A1* | 9/2009 | Anglin et al. | 709/231 |
| 2010/0070715 A1* | 3/2010 | Waltermann | G06F 12/0868 |
| | | | 711/129 |
| 2010/0312800 A1* | 12/2010 | Lumb | 707/796 |

OTHER PUBLICATIONS

Raffo, Dave, Dedupe update: What's coming in 2009—Storage Technology Magazine, Mar. 2009 (7 pages).

Rivera, Thomas—SEPATON, SNIA Understanding Data Deduplication, 2009 (41 pages).

\* cited by examiner

METHOD AND APPARATUS FOR RANDOM ACCESS OF DATA STORED IN A SEQUENTIAL MANNER

BACKGROUND

In storage technology, use of mass data storage facilities to provide data storage as a backup to mitigate the impact of data loss is well known. In order to improve storage capacity, many different deduplication techniques have been developed in which duplicated data is removed and a pointer to previously stored data is stored in its place. One deduplication technique includes inline dedupe processing in which data is passed to a dedupe process which compares data items or blocks of data (such as files or parts of files) with existing stored data to remove duplications of data before it is passed to the backup storage. Another technique includes post dedupe processing in which data items are first stored and then deduplicated after the backup is complete.

Virtual Tape Libraries (VTL) are known to the inventors that use a virtualised tape access model such as, for example, Small Computer System Interface (SCSI), SCSI Stream Commands (SSC) specification. This assumes no random IO and will not allow a write to occur mid data stream without the truncation of later data in the stream (as per an actual tape device). As a result VTL does not enable easy access to stored data using existing file share systems, e.g. Network File System (NFS), Common Internet File System (CIFS), which are known Network Attached Storage (NAS) protocols allowing full random IO.

BRIEF DESCRIPTION OF DRAWINGS

For a more complete understanding of the present invention, reference is now made, by way of example only, to the following description taken in conjunction with the accompanying drawings in which.

DETAILED DESCRIPTION

Figure 1:
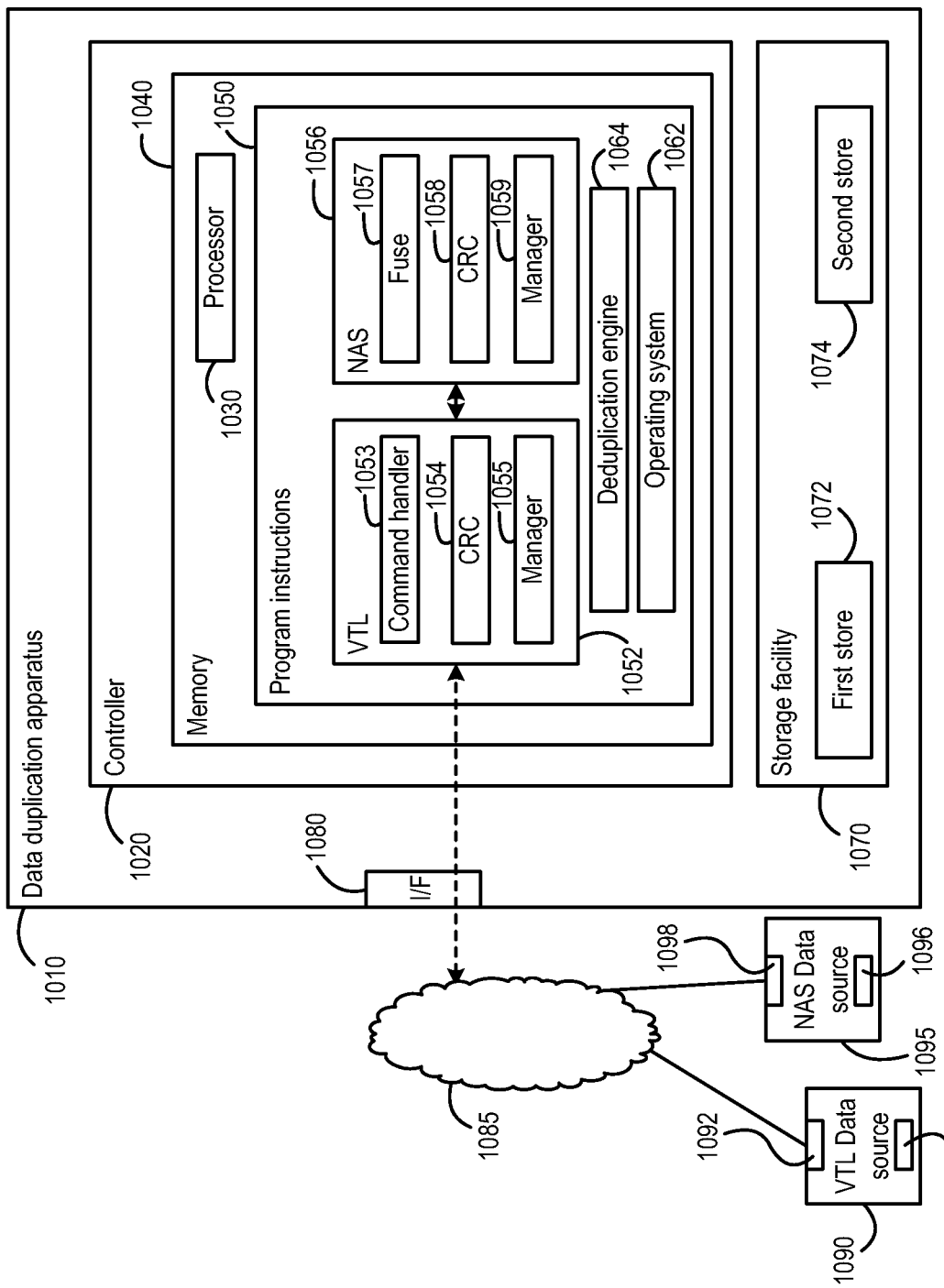
FIG. 1 is a schematic of data deduplication apparatus including randomly accessing sequentially stored data.

With reference to FIG. 1, an exemplary data deduplication apparatus 1010 comprises data processing apparatus in the form of a controller 1020 having a processor 1030 and a computer readable medium 1040 in the form of a memory. The memory 1040 can comprise, for example, RAM, such as DRAM, and/or ROM, and/or any other convenient form of fast direct access memory. The deduplication apparatus 1010 further comprises a storage facility 1070 comprising a first store 1072 and a second store 1074. The first store 1072 may provide slower access speeds than the second store 1074. The first store 1072 comprises hard disk drives, or any other convenient form of mass storage. The second store 1074 comprises a memory for storing data which allows random access of the stored data, for example, typical random access devices such as disks or other presenting a file system level abstraction and allowing random access.

The hardware of the exemplary data deduplication apparatus 1010 can, for example, be based on an industry standard server. The storage facility 1070 can be located in an enclosure together with the data processing apparatus 1010 or separately at a remote location, for example.

During use of the data deduplication apparatus 1010, the memory 1040 has stored thereon computer program instructions 1050 executable on the processor 1030, including an operating system 1062 comprising, for example, a Linux, UNIX or OS-X based operating system, Microsoft Windows operating system, or any other suitable operating system. The data deduplication apparatus 1010 also includes at least one communications interface 1080 for communicating with at least one external data source 1090, 1095, for example over a network 1085. The or each data source 1090, 1095 can comprise a computer system such as a host server or other suitable computer system, executing a storage application program 1091, for example a backup application having a backup data in a VTL file system and a storage application program 1096, for example having backup data in a Network Attached Storage (NAS) file system.

A link can be formed between the communications interface 1080 and host communications interfaces 1092, 1098 over the network 1085, for example comprising a Gigabit Ethernet LAN or any other suitable technology. The communications interface 1080 can comprise, for example, a host bus adapter (HBA) using Internet Small Computer System Interface (iSCSI) over Ethernet or Fibre Channel (FC) protocols for handling backup data in a tape data storage format, a Network Interface Card (NIC) using NFS or CIFS network file system protocols for handling backup data in a NAS file system data storage format, or any other convenient type of interface.

The program instructions 1050 also include modules 1052, 1056 that, when executed by the processor 1030, respectively, provide at least two storage collection interfaces, in the form, for example, of a virtual tape library (VTL) interface 1052 and NAS interface 1056. The program instructions 1050 also include a module 1064 that when executed by the processor 1030, provides a data deduplication engine 1064.

The exemplary virtual tape library (VTL) interface 1052 is operable to emulate at least one physical tape library, storing in a tape data storage format, for example a sequential data storage format. The VTL interface 1052 is also operable to communicate with storage facilities 1070 having existing storage applications of physical tape libraries. The exemplary Network Attached Storage (NAS) interface 1056 is operable to communicate with a data source having a Network File System (NFS) and operable to communicate with the storage facilities 1070 having existing storage applications of physical tape libraries. A communications path can be established between a storage application 1091 of the VTL data source 1090 and the VTL interface 1052 using the interface 1092 and the network 1085. A communication path can also be established between storage application 1096 having a NFS and the NAS interface 1056 using the interface 1098 and the network 1085.

The VTL interface 1052 comprises a command handler 1053 for handling commands within a data stream from the data source 1092, for example commands from a SCSI command set. The VTL interface 1052 may further comprise a Cyclic Redundancy Check (CRC) calculator 1054 for performing a CRC calculation on blocks of data before deduplication and recalculate the CRC for these blocks restored from the deduped data to determine if data retrieved from the dedupe store is accurate and a buffer manager 1055 for interfacing with the deduplication engine 1064 and for reconstituting deduped data for the host computer system in response to the appropriate command. Although a CRC calculator is shown in FIG. 1, in an alternative embodiment, it may be excluded from the VTL interface 1052.

The NAS interface 1056 comprises a File System in User Space (FUSE) layer 1057. The FUSE layer 1057 is an operating system component that allows development of file system technologies and Application Programmer Interfaces (API) to be developed in user space as opposed to within the kernel memory space. It also comprises an CRC calculator 1054, as above, for performing a CRC calculation on blocks of data before deduplication and recalculate the CRC for these blocks restored from the deduped data to determine if data retrieved from the dedupe store is accurate and a buffer manager 1059 for interfacing with the deduplication engine 1064 and for reconstituting deduped data for the host computer system in response to io requests. Although a CRC calculator is shown in FIG. 1, in an alternative embodiment, it may be excluded from the NAS interface.

In operation, incoming data is received by respective interfaces 1052, 1056 from the data sources 1090, 1095 of the host computer systems via the interfaces 1092, 1098 of the data sources 1090, 1095, the network 1085 and the interface 1080 of the apparatus 1010.

For the data source 1090, the VTL interface 1052 receives a stream of data which includes data records and commands in a tape data storage format. The command handler 1053 actions the commands and passes the data records of the data stream to the buffer manager 1055 which interfaces with the deduplication engine 1064. The data records are passed to the deduplication engine 1064. The data records comprise a plurality of data items. A hash algorithm is run and a hash identifier calculated for each data item. The hash identifiers are compared with previously calculated hash identifiers and if a match is found, the data item for that hash identifier is a duplicate and can be removed. It is replaced with a pointer to the data item associated with the previously calculated matching hash identifier. The deduplicated data is stored in a sequential, tape format in the first store 1072 of the storage facility 1070.

A CRC may be calculated by the CRC calculator 1054 for blocks of data of the received data stream. The calculated CRCs are stored within the storage facility 1070 or alternatively they may be stored in the memory 1040.

Figure 2:
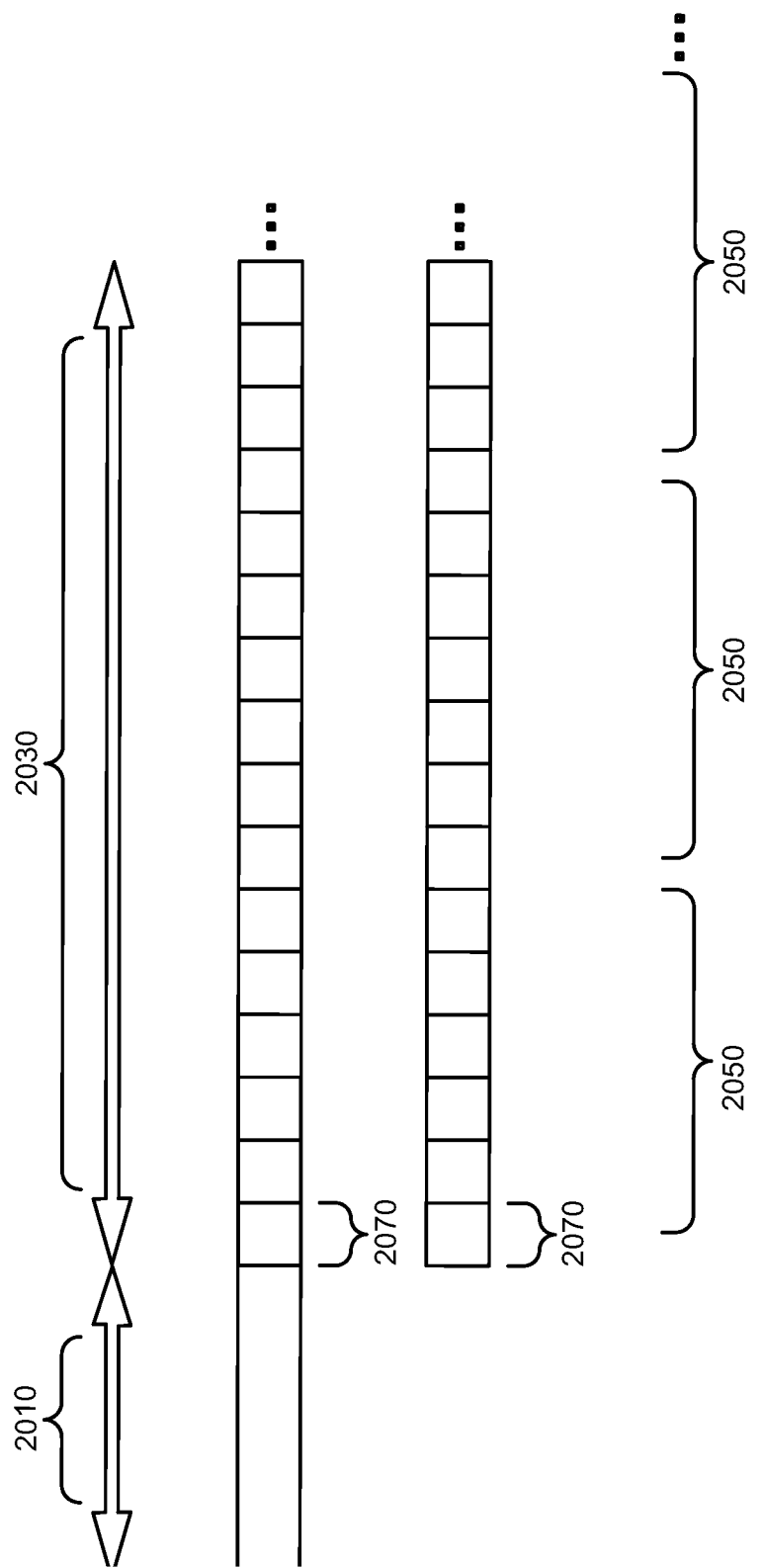
FIG. 2 is an example of the data processed to be sequentially stored for random access.

The data is then pre-processed for deduplication by the buffer manager 1055. Any portions of the data are analysed as to their suitability for deduplication, for example, unique file identifiers, headers etc. As a result, the portion of data not suitable for deduplication, i.e. non-dedupe region 2010 in the example of FIG. 2 is stored directly in the first store 1072. The logic behind this is that it tends to be where the ISV applications keep their headers and catalogues—and this gets rewritten frequently, thus causing a potential reduction in dedupe ratio and an uplift in deduplication housekeeping activity, for example.

The remainder of the data stream of the example of FIG. 2 is the dedupe region 2030 and may be divided into chunks 2050, as shown for example, in FIG. 2, for example 128 Mbyte chunks. The chunks 2050 may be of fixed length, may comprise a whole file or may be variable based on naturally occurring internal file boundaries, for example. Each chunk 2050 may be subdivided into a plurality of buckets 2070, for example 64 Kbyte buckets.

The data is then stored in the storage facility 1070 deduplicated by the deduplication engine 1064. The data may be deduplicated by inline dedupe processing or alternatively, the data items may be post processed.

The deduplicated data is stored in a first store 1072. This may comprise a physical tape device or library of physical tape devices or a virtual tape library which emulates the physical tape library, consequently, the data is store in a sequential manner.

An access request may be made at the host computer system via the computer system of the NAS data source 1095 and is received at the FUSE layer 1057 of the NAS interface 1056. The request may be a read request at a predetermined location within the sequence of stored, deduplicated data. The buffer manager 1059 retrieves the deduplicated data from the first store 1072.

Upon a random write request, for example, a 'write in place', being requested in which an IO is requested at a location where data already exists within the first store 1072, a portion of the data at that location is copied from the first store 1072 into a second store 1074. Although shown in FIG. 1 as a separate store, it can be appreciated that the second store 1074 may comprise a file into which the portion of data is copied. The portion of data copied may correspond to the requested range of data or a number of buckets. In only copying the requested portion of data, minimal space is requested for the second store 1074. However, additional processing is requested in order to maintain clear indications of the portion of data maintained in the second store 1074. If a number of buckets are copied, the appropriate buckets that are spanned by the range of write in place are marked as used.

A CRC may be calculated over each 64 KB 'bucket' for data destined for the first store 1072 or the second store 1074. The calculated CRCs are stored separately to the dedupe data. The stored CRCs are then used to confirm that data reconstituted from the dedupe data is accurate.

If a random read request is made for data within the first portion of data in the non-dedupe region 2010, then data is retrieved straight from the second store 1074. If the read request is for data within the dedupe range 2030, it is determined whether the data requested is within the second store 1074 for the appropriate buckets being addressed. If it is determined that contents covered by the read request are within the second store 1074 data is retrieved from the second store 1074, rather than from the first store 1072. If it is determined that contents covered by the read request are within the first store 1072 data is retrieved from the first store 1072, rather than from the second store 1074.

A CRC may be calculated for the reconstituted data and this is compared with the stored CRC for the original data to verify that it corresponds to the original data. If a mismatch occurs, this can be flagged as an error.

If a write request is made for the non dedupe region 2010, this is merely retrieved from second store 1074 and edited. If it is determined that modifying the data of the non-dedupe region is downwards based upon such usage, the non-dedupe region may be resized.

Maintaining the second store 1074 as described above enables random 10 supported by existing filing systems such as, for example, NFS and CIFS to be used within a VTL. The FUSE layer 1057 of the NAS interface 1056 provides the file sharing technology for the existing NFS and CIFS sharing technologies without having to implement the network stack. The implementation of the FUSE layer 1057 in user space between the deduplication engine 1064 and the outside protocol servers (NFS and the exemplary CIFS server Samba) allows for a NAS solution to be provided that dedupes to be one of transforming file 10 requests as performed by a file system into requests that can be processed with sequentially stored data such as in a VTL system.

Further, this reduces housework for the storage facility for example when dedupe items get deleted due to file truncations (for example), then it avoids more housework for dedupe to free up space previously used that now needs to be reclaimed.

It should be appreciated by those skilled in the art that the choice of 128 MB chunks and the subdivision of that into 64 KB buckets is arbitrary. It is desirable not to create lots of data that is comprised of small files. Equally, other size choices could be made, in general so long as the range of a file within the second store is an integral number of buckets large.

On a read back, data is taken from the first store 1072 or from the second store 1074 for a given (64 KB) bucket. Data is not reconstituted from both as this would increase the system complexity.

Thus, for writes at the end of data which is currently within the second store, data is appended to both the data of the first store 1072 and the data of the second store 1074 until such time as a bucket is full, then data is appended to data of the first store; in this way the consistency is maintained and data comes from either the first store 1072 or the second store 1074. In the case where files are truncated downwards, bucket contents are adjusted for the truncation downwards, thus the contents of buckets is the most that can be read from a given location of the second store 1074.

Furthermore 'bucketisation' of IO into fixed sized pieces enables the calculation of CRCs over incoming and outgoing data which is valuable in VTL but that existing NAS solutions do not provide for their dedupe systems.

For the above system the amount of 'sparseness' is limited. As a result users cannot create sparse files entirely in the same way that they can with an existing NAS solution—a typical file is created in C thus (assuming a new file):

```
fd = open(..); /* open a new file */
write(fd, &byte, 1); /* write a byte to it */
seek(fd,1048576. SEEK_SET); /* seek forwards 1MB */
write(fd, &byte, 1); /* write another byte to it */
close(fd);
```

This creates a file that appears to the file system that it has 1 MB+2 bytes length, but in reality has two bytes of user data within it.

This is overcome by limiting the distance of sparseness such that a limited amount of sparseness is allowed and results in padding with zeroes.

Any of the features disclosed in this specification, including the accompanying claims, abstract and drawings, and/or any of the steps of any method or process so disclosed, may be combined in any combination, except combinations were the sum of such features and/or steps are mutually exclusive. Each feature disclosed in this specification, including the accompanying claims, abstract and drawings may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiment. The claims should be construed to cover merely the foregoing embodiment, but also any embodiments which fall within the scope of the claims which will be readily apparent to the ordinarily skilled person reading the foregoing. The invention extends to any novel one, or any novel combination, of the features disclosed in this specification, including the accompanying claims, abstract and drawings, or to any novel one, or any novel combination, of the steps of any method or process so disclosed.

The embodiment within the scope of the present invention also includes at least one computer readable medium for having above described computer executable program instructions or data structures stored thereon, also known as computer software. Such computer readable medium can be any suitable medium accessible by a general purpose or special purpose computer system or data storage system. Computer executable instructions may comprise, for example, instructions and data which cause a general purpose computer, special purpose computer, or other special purpose processing device to perform a certain function or group of functions. The software of the present invention can be implemented in several different ways. The implementation of software is not limiting on the invention.

The invention claimed is:

1. A method performed by at least one processor, comprising:
    selecting chunks of data for deduplication;
    deduplicating the selected chunks of data to form deduplicated chunks, the deduplicating comprising removing a given chunk of the selected chunks of data and replacing the given chunk with a pointer to the given chunk, the deduplicated chunks comprising the pointer and remaining chunks of the selected chunks of data, the remaining chunks excluding the given chunk that has been removed;
    sequentially storing the deduplicated chunks including the pointer and the remaining chunks in a sequential format in a first store;
    maintaining a second store that contains a copy of a portion of at least one chunk of the remaining chunks, the second store storing data in a manner to allow random access; and
    in response to a read request for data at a location within the sequence of stored data:
        determining that the location is within the first store;
        determining whether at least a part of the location is within the second store in response to determining that the location is within the first store;
        accessing data of the second store in response to determining that the at least a part of the location is within the second store; and
        accessing data of the first store in response to determining that the at least a part of the location is not within the second store.

2. The method of claim 1, wherein each chunk of the remaining chunks comprises a plurality of buckets.

3. The method of claim 2, wherein the portion of the at least one chunk of the remaining chunks contained in the second store comprises at least one bucket of the remaining chunks.

4. The method of claim 1, further comprising:
    receiving a write request for data at a location within the sequence of stored data;
    determining that the location of the write request is within the deduplicated chunks in the first store; and
    copying a portion of at least one chunk of the remaining chunks into the second store in response to determining that the location of the write request is within the deduplicated chunks.

5. A method comprising:
    selecting, by at least one processor, chunks of data for deduplication;

deduplicating, by the at least one processor, the selected chunks of data to form deduplicated chunks, the deduplicating comprising removing given chunks of the selected chunks of data and replacing the given chunks with respective pointers to the given chunks, the deduplicated chunks comprising the pointers and remaining chunks of the selected chunks of data, the remaining chunks excluding the given chunks that have been removed;

sequentially storing the deduplicated chunks including the pointers and the remaining chunks in a first store;

maintaining a second store to store data that is enabled for random access;

receiving a write request for data at a random location within a sequence of stored data;

determining if the random location is within the deduplicated chunks in the first store;

copying a portion of a chunk of the remaining chunks into the second store in response to determining that the random location is within the deduplicated chunks;

receiving a read request for data at a random location within the sequence of stored data;

determining that the random location of the read request is within the first store;

determining whether at least a part of the random location of the read request is within the second store in response to determining that the random location of the read request is within the first store;

accessing data of the second store in response to determining that the at least a part of the random location of the read request is within the second store; and accessing data of the first store in response to determining that the at least a part of the random location of the read request is not within the second store.

6. The method of claim 5, further comprising:
calculating a CRC (cyclic redundancy check) for a block of data; and
storing the calculated CRC.

7. The method of claim 6, further comprising:
upon reconstituting deduplicated data, calculating a CRC for each block of data in the reconstituted deduplicated data;
comparing the calculated CRC for each block of data in the reconstituted deduplicated data with a previously stored CRC for a corresponding block of data; and
indicating an error if a mismatch occurs in the comparing.

8. A system comprising:
at least one processor;
a deduplication engine executable on the at least one processor to select chunks of data for deduplication and to deduplicate the selected chunks of data to form deduplicated chunks, the deduplicating comprising removing a given chunk of the selected chunks of data and replacing the given chunk with a pointer to the given chunk, the deduplicated chunks comprising the pointer and remaining chunks of the selected chunks of data, the remaining chunks excluding the given chunk that has been removed;
a first store to store the deduplicated chunks including the pointer and the remaining chunks in a sequential format;
a second store to store a copy of at least a portion of at least one chunk of the remaining chunks in a manner to allow random access; and
program instructions executable on the at least one processor to:

receive a read request for data at a location within a sequence of stored data;
determine that the location of the read request is within the first store;
determine whether at least a part of the location of the read request is within the second store in response to determining that the location of the read request is within the first store;
access data of the second store in response to determining that the at least a part of the location of the read request is within the second store; and
access data of the first store in response to determining that the at least a part of the location of the read request is not within the second store.

9. The system of claim 8, further comprising:
a VTL (virtual tape library) interface to interface with a VTL host computer system; and
a NAS (network attached storage) interface to interface with a NAS host computer system.

10. The system of claim 9, wherein the NAS interface comprises:
a FUSE (file system in user space) layer to interface with NAS data sources in user space; and
a buffer manager to interface with the deduplication engine.

11. The system of claim 9, wherein each of the VTL interface and the NAS interface comprises a CRC (cyclic redundancy check) calculator to calculate a CRC for each block of data.

12. The system of claim 8, wherein the program instructions are executable on the at least one processor to:
receive a write request for data at a location within the sequence of stored data;
determine that the location of the write request is within the deduplicated chunks in the first store; and
copy a portion of at least one chunk of the remaining chunks into the second store in response to determining that the location of the write request is within the deduplicated chunks.

13. A non-transitory computer readable medium storing instructions that when executed cause a computer system to:
select chunks of data for deduplication;
deduplicate the selected chunks of data to form deduplicated chunks, the deduplicating comprising removing given chunks of the selected chunks of data and replacing the given chunks with respective pointers to the given chunks, the deduplicated chunks comprising the pointers and remaining chunks of the selected chunks of data, the remaining chunks excluding the given chunks that have been removed;
sequentially store the deduplicated chunks including the pointers and the remaining chunks in a sequential format in a first store;
maintain a second store containing a copy of a portion of at least one chunk of the remaining chunks, the second store storing data in a manner to allow random access;
receive a read request for data at a location within the sequence of stored data;
determine that the location of the read request is within the first store;
determine whether at least a part of the location of the read request is within the second store in response to determining that the location of the read request is within the first store;
access data of the second store in response to determining that the at least a part of the location of the read request is within the second store; and access data of the first store in response to determining that the at least a part of the location of the read request is not within the second store.

14. The non-transitory computer readable medium of claim 13, wherein each chunk of the remaining chunks comprises a plurality of buckets.

15. The non-transitory computer readable medium of claim 14, wherein the portion of the at least one chunk of the remaining chunks contained in the second store comprises at least one bucket of the remaining chunks.

16. The non-transitory computer readable medium of claim 14, wherein the computer program instructions, when executed by the at least one processor, cause the computer system to:
receive a write request for data at a location within the sequence of stored data;
determine that the location of the write request is within the deduplicated chunks in the first store; and
copy at least one bucket of the remaining chunks into the second store in response to determining that the location of the write request is within the deduplicated chunks.

17. The non-transitory computer readable medium of claim 13, wherein the computer program instructions, when executed by the at least one processor, cause the computer system to:
calculate a CRC (cyclic redundancy check) for a block of data; and
store the calculated CRC.

18. The non-transitory computer readable medium of claim 17, wherein the computer program instructions, when executed by the at least one processor, cause the computer system to:
upon reconstituting deduplicated data, calculate a CRC for each block of data in the reconstituted deduplicated data;
compare the calculated CRC for each block of data in the reconstituted deduplicated data with a previously stored CRC for a corresponding block of data; and
indicate an error if a mismatch occurs in the comparing.

* * * * *